United States Patent [19]
Rother

[11] Patent Number: 6,141,608
[45] Date of Patent: Oct. 31, 2000

[54] SYSTEM FOR DYNAMIC DIAGNOSIS OF APPARATUS OPERATING CONDITIONS

[75] Inventor: Paul J. Rother, Grayslake, Ill.

[73] Assignee: Snap-On Tools Company, Kenosha, Wis.

[21] Appl. No.: 09/179,747

[22] Filed: Oct. 27, 1998

Related U.S. Application Data

[60] Provisional application No. 60/063,361, Oct. 28, 1997.

[51] Int. Cl.[7] ........................... G01M 17/00; G06F 17/40
[52] U.S. Cl. ................................ 701/33; 701/32
[58] Field of Search ................. 701/29, 32, 33, 701/35; 73/117.2, 117.3

[56] References Cited

U.S. PATENT DOCUMENTS

| | | |
|---|---|---|
| H1273 | 1/1994 | Novick . |
| 4,418,388 | 11/1983 | Allgor et al. . |
| 4,658,370 | 4/1987 | Erman et al. . |
| 4,796,206 | 1/1989 | Boscove et al. ........................... 701/99 |
| 5,195,173 | 3/1993 | Gordon et al. ........................... 706/11 |
| 5,337,320 | 8/1994 | Kung . |
| 5,338,189 | 8/1994 | Hata et al. . |
| 5,408,412 | 4/1995 | Hogg et al. . |
| 5,408,871 | 4/1995 | Lieder et al. . |
| 5,442,549 | 8/1995 | Larson ....................................... 701/35 |
| 5,522,363 | 6/1996 | Gotoh . |
| 5,533,093 | 7/1996 | Horton et al. ............................. 379/21 |
| 5,533,332 | 7/1996 | Uchikawa . |
| 5,541,840 | 7/1996 | Gurne et al. .............................. 701/33 |
| 5,546,795 | 8/1996 | Yamagishi . |
| 5,550,762 | 8/1996 | Doll . |
| 5,568,725 | 10/1996 | Uchikawa . |
| 5,575,267 | 11/1996 | Matsumoto et al. . |
| 5,614,664 | 3/1997 | Yamagishi . |
| 5,631,831 | 5/1997 | Bird et al. ................................. 701/29 |
| 5,640,846 | 6/1997 | Ohuchi et al. . |
| 5,644,073 | 7/1997 | Matsuno et al. . |
| 5,729,452 | 3/1998 | Smith et al. .............................. 701/29 |

FOREIGN PATENT DOCUMENTS 63-101731  5/1988  Japan .

*Primary Examiner*—Michael J. Zanelli
*Attorney, Agent, or Firm*—Seyfarth Shaw

[57] ABSTRACT

A diagnostic platform includes a processor, storage media and user interfaces, including a display screen, the processor being coupled to engine analyzer hardware and adapted to be coupled to a scanner for downloading data from vehicle on-board computers. The system stores libraries of information regarding vehicle identifications, drivability symptoms exhibited by vehicles, vehicle system and component tests and service codes which can be registered by the vehicle on-board computer. System software permits the user to input an identification of the vehicle under test and, in one mode of operation, displays a library of faults, such as symptoms or service codes, from which the user can select those exhibited by the vehicle, whereupon the system selects from the test library those tests pertinent to diagnosis of the causes of the selected faults and displays them in a hierarchically ranked order based on likelihood of successful diagnosis of the faults. The user can then select and initiate any displayed test. In other modes, the system initially displays one of the libraries of system or component tests, from which the user selects those deemed appropriate, whereupon the system highlights icons which can be selected for initiating pertinent test procedures. Selected test procedures may include links to the engine analyzer or scanner hardware or other appropriate test modules.

15 Claims, 6 Drawing Sheets

FIG. 2

| VEHICLE IDENTIFICATION | TEST ANALYSIS | MANUAL TESTING | INFORMATION | SHOP MANAGEMENT |

DESCRIPTION    MIN SETUP    LAST 20    WORK ORDERS

1985 F  INFINITI
1986 G  ISUZU
1987 H  JAGUAR
1988 J  JEEP
1989 K  LAND ROVER
1990 L  LEXUS
1991 M  LINCOLN
1992 N  MAZDA
1993 P  MERCEDES-BENZ          BONNEVILLE     3.8   1   SFI
1994 R  MERCURY                FIREBIRD           L
1995 S  MITSUBISHI             GRAND AM
1996 T  NISSAN                 GRAND PRIX
1997 V  OLDSMOBILE             LEMANS
2000    PLYMOUTH               SUNBIRD
        PONTIAC                TRANSPORT
        PORSCHE

1993 PONTIAC BONNEVILLE 3.8 1              ACCEPT

FIG. 3

| | VEHICLE IDENTIFICATION | MANUAL TESTING | INFORMATION | SHOP MANAGEMENT | |
| --- | --- | --- | --- | --- | --- |
| 36 | 32 TEST ANALYSIS | 37 | | | 39 |
| | SYMPTOMS | COMPONENT/SYSTEM | FAULT CODES 38 | | |

| SYMPTOM | CAUSE | TEST PROCEEDURE | RANK |
| --- | --- | --- | --- |
| BATTERY GOES DEAD | ACCESS VEHICLE FAULT CODES | FAULT CODE RETRIEVAL | 10 |
| NO START, NO OR SLOW CRANK | LEAKING SUPCHGR INTAKE GAS | QUICK TIP | 8 |
| NO START, CRANKS OK | INJECTOR DRIVER/INJ FLOW | FUEL INJECTOR-MFI | 7 |
| HARD START, SLOW CRANK | VACUUM LEAK | VACUUM LEAK | 5 |
| HARD START, CRANKS OK | DEFECTIVE PCM BOARD | QUICK TIP | 4 |
| ENG STARTS AND DIES | EGR SYSTEM | EGR | 4 |
| ENG DIES AT IDLE/DECEL/BRKG | IAC CIRCUIT | IDLE AIR CONTROL SOLENOID | 4 |
| ENG DIES AT ACCEL/CRUISE | IGNITION SYSTEM | ENGINE RUNNING-DIS AND MFI | 4 |
| HESITATION/STUMBLD/SAG | MAF CIRCUIT | MASS AIR FLOW SENSOR | 4 |
| MISFIRE | GROUNDED OR BROKEN MOUNT | QUICK TIP | 3 |
| RUNS ROUGH | THROTTLE BORE COKING | QUICK TIP | 3 |
| IDLE SPEED LOW | TP CIRCUIT | THROTTLE POSITION SENSOR | 3 |
| IDLE SPEED HIGH | INCORRECT FUEL PRESS/VOLUME | FUEL DELIVERY-MFI | 2 |
| IDLE SPEED HUNTING | POOR FUEL QUALITY | QUICK TIP | 2 |
| LACK OF POWER/SLUGGISH | TCC WILL NOT DISENGAGE | QUICK TIP | 2 |
| SURGES/CHUGGLES | COMPRESSOR/VALVE TIMING | ENGINE MECHANICAL-DIS | 1 |
| POOR FUEL ECONOMY | | | |
| EXHAUST ODOR/BLACK SMOKE | | | |
| BACKFIRE THRU INTAKE/EXH | | | |

40  41  42  43

1993 PONTIAC BONNEVILLE 3.8 1

| QUICK TIP | ANALYZER | SCAN TOOL | SHOP KEY | LAB SCOPE/ DVOM |
| --- | --- | --- | --- | --- |
| 44 | 45 | 46 | 47 | 48 |

SYSTEM FOR DYNAMIC DIAGNOSIS OF APPARATUS OPERATING CONDITIONS

CROSS-REFERENCE TO RELATED APPLICATION

This application claims the benefit of U.S. Provisional Application No. 60/063,361, filed Oct. 28, 1997.

BACKGROUND OF THE INVENTION

The present invention relates generally to test and diagnosis systems for machines or other operating apparatus, and has particular application to automotive vehicles, particularly vehicles powered by internal combustion engines. While the invention is described in the context of an engine analyzer system, the principles of the present invention are usable with other types of vehicle diagnostic systems, such as air conditioning testing and servicing systems, wheel balancing systems, automotive gas emissions analysis systems, and the like, and are also usable with non-automotive apparatus.

A number of different types of diagnostic tools have been heretofore used to assist in diagnosis and repair of fault conditions in automotive vehicles. Such tools include engine analyzers, which are designed to monitor a variety of operating conditions of an internal combustion engine, and scanners for downloading data from vehicle on-board computers. In addition, diagnostic tools may include such standard laboratory-type tools as laboratory oscilloscopes, digital volt-Ohm meters ("DVOM") and the like. Basically, these various diagnostic tools fall into two categories, data providers and platform diagnostics, although some engine analyzers, such as that disclosed in U.S. Pat. No. 5,250,935, can interface with scanners and can operate in a mode simulating a lab scope and/or a DVOM.

Data providers (e.g., DVOMS, scanners and laboratory oscilloscopes), simply give the user data, and the user must determine his own diagnostic test procedures and conclusions. Data provider tools rely completely on the user's ability to decide which tool to use and what to do with the data provided, including selection of tests which should be performed, interpreting the test results and the like.

Platform products, e.g., engine analyzers, are typically high-end systems capable of performing a variety of different types of tests. They may provide the user with automatic test sequences that systematically test the vehicle in a particular order and then provide diagnostic conclusions based on the test results. Platform products, such as engine analyzers, are usually focused on particular types of problems or particular vehicle systems. They may take considerable time to hook up all the necessary leads and perform the comprehensive tests, and the user must decide which product to use and how the test data should be integrated into an overall diagnosis.

There are also information systems available as stand-alone software packages which provide service and repair information for a wide variety of automotive vehicles. However, such products are difficult to navigate through to find the information needed for diagnosis and repair and they are typically based only on original equipment diagnostic information, and may not contain information on problems experienced in the field over the life of the vehicle.

SUMMARY OF THE INVENTION

It is a general object of the invention to provide an improved diagnostic system which avoids the disadvantages of prior such systems while affording additional structural and operating advantages.

An important feature of the invention is the provision of a diagnostic system which will guide the user in the selection of tests to be performed and minimize the performance of needless tests.

In connection with the foregoing feature, a further feature of the invention is the provision of a diagnostic system of the type set forth which permits fault-based selection of tests.

Yet another feature of the invention is the provision of a diagnostic system of the type set forth which facilitates modification and updating to include information on problems and cures experienced in the field over the life of an apparatus under test.

Still another feature of the invention is the provision of a diagnostic system of the type set forth which can be readily integrated with pre-existing diagnostic hardware platforms.

In connection with the foregoing feature, a still further feature of the invention is the provision of a diagnostic system of the type set forth which is modular.

Yet another feature of the invention is the provision of a diagnostic system of the type set forth, which is designed to rank selected tests in an order most likely to successfully diagnose an apparatus problem.

Another feature of the invention is the provision of a diagnostic system of the type set forth which includes storage of the results of user applications of the system, for later incorporation in system updates.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

FIGS. 2–5 are screen displays of an engine analyzer incorporating the diagnostic system of the present invention.

DESCRIPTION OF THE PREFERRED EMBODIMENT

Figure 1:
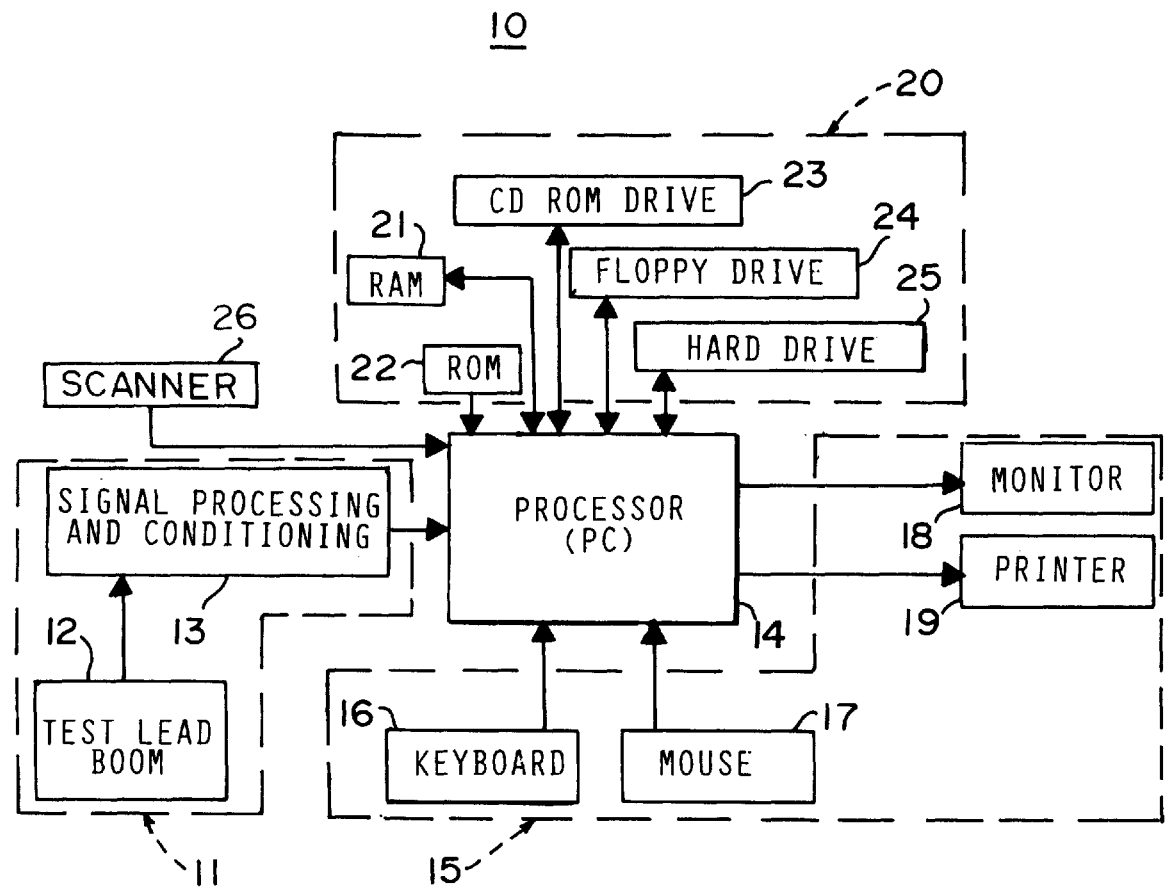
FIG. 1 is a functional block diagram of an engine analyzer incorporating the diagnostic system of the present invention.

Referring to FIG. 1, there is illustrated a functional block diagram of a diagnostic platform 10 incorporating the diagnostic system of the present invention. The platform 10 is illustrated as relating to an engine analyzer system but, as was indicated above, it could be applicable to other types of vehicle or non-vehicle diagnostic systems. The platform 10 includes engine analyzer hardware 11, which typically includes a test lead boom 12, including a plurality of test leads and sensors adapted to be connected to various points of an associated vehicle engine, and signal processing and conditioning hardware 13 for interfacing the test lead boom to a central processor 14. Preferably, the diagnostic platform 10 is a personal computer ("PC")-WINDOWS®-based platform, such as that provided in the Sun® System 500 engine analyzer sold by Snap-on Diagnostics, but it will be appreciated that the present invention would also be usable with other types of engine analyzer systems, such as that disclosed in U.S. Pat. No. 5,250,935. The diagnostic platform 10 typically includes a scanner 26 and a user interface 15, which may include any one or more of different input/output devices, such as a keyboard 16, a mouse 17, a display device or monitor 18, and a printer 19. Also, the diagnostic platform 10 is typically provided with storage media 20, which may include one or more of a number of different types of data and software storage devices, including RAM 21, ROM 22, CD ROM drive 23, floppy drive 24 and hard drive 25. The dynamic diagnostic system of the present invention includes program software, which may be resident in ROM 22, or which may comprise a stand-alone software package stored in any of the media 23–25.

A fundamental aspect of the invention is that it permits a fault-based drivability diagnosis of a vehicle. In such a fault-based mode of operation, the system essentially presents the user with a menu of problems indicated, e.g., by symptoms or service codes, and the user selects those problems which are pertinent to the vehicle under test. Based upon the selected faults, the system then presents the user with a list of tests to be performed to diagnose the cause or causes of the faults. The tests are listed in the order in which they would most likely be effective in diagnosing the vehicle faults, based upon the manufacturer's information and previous repair and diagnosis experience with this type of vehicle.

It is a significant aspect of the invention that the diagnosis system is also capable of operating in other modes, viz., a System Testing mode, a Component Testing mode and a Manual mode. In all modes, except for the Manual mode, the system will display one or more tests to be performed on the vehicle from a library of system tests and component tests, representative examples of which are illustrated in the drawings.

Any use of the diagnostic system of the present invention starts with a vehicle identification procedure for the vehicle to be diagnosed. Referring to FIG. 2, there is illustrated a screen display 30 on the monitor 18, which may be a digital computer-type display. The display screen 30 has arrayed across the top thereof a series of icons 31–35, respectively designated "Vehicle Identification", "Test/Analysis", "Manual Testing", "Information", and "Shop Management." For purposes of implementing the vehicle identification procedure, the icon 31 is selected, bringing up the screen display shown in FIG. 2. The system presents the user with a number of questions or fields, such as model year, make, model name, engine size and the like, each field presenting the user with a menu of unique values from within that field from which the user may select. The user makes a selection for that field in a well-known manner, such as by use of the mouse 17, and the value is added to the database search key. FIG. 2 illustrates several such fields and the menus associated therewith. If a menu exceeds the length of its associated display window, the menu can be scrolled in a known manner by use of a scroll bar icon. The system is dynamic as to the number of questions the user must answer to identify the vehicle, allowing the user to identify the vehicle without having to answer any unnecessary questions. In order to perform system diagnostics, the vehicle identification must have resolution to at least the year, make, model, engine size, engine code, fuel type, ignition type and air measurement type for the vehicle. During run time, if additional vehicle information is needed to perform a selected test, the system will so indicate and present the user with the appropriate fields and menus to enter the needed information.

Once the vehicle is identified, the user is able to begin diagnosis by selecting the Test/Analysis icon 32, which brings up a screen display similar to that in FIG. 3, presenting three different files 36–38, respectively labeled "Symptoms", "Component/System" and "Service Codes", corresponding to the above-described automatic diagnostic modes. The "Symptoms" and "Service Codes" files relate to fault-based modes. While the following discussion is with respect to the Symptom Testing mode, it also applies in general to the Service Code Testing mode of operation. If the Symptom file is selected, it is displayed in the foreground in the screen display 39 of FIG. 3. The screen display 39 includes a menu 40 of symptoms which can be exhibited by the vehicle type selected in the screen display 30 of FIG. 2, which vehicle type is indicated at the bottom of the screen display 39, as at 41. The list of symptoms presented to the user is representative of industry symptom diagnosis and supports the majority of drivability complaints.

A standard list of symptoms is possible because vehicles use common technology. They each have mechanical, ignition, fuel, and computer components that function in roughly the same manner. Other more specific symptoms can usually be assigned to one or more of the symptoms from the main symptom list. For example, a specific symptom of "Vehicle Dies When Taking a Right Turn" will fit under a less specific symptom of "Vehicle Dies at Idle/Deceleration/Braking." The tests to diagnose the condition are generally the same. A standard list of symptoms is used because it provides a consistent interface and diagnostic philosophy for all vehicles, promotes technician and service writer familiarization and provides the most efficient manner of developing a "closed loop" system of classifying field data for symptoms and their causes, as will be discussed more fully below.

The user/technician selects one or more of the listed symptoms which are exhibited by the vehicle under test, as determined from an interview with the vehicle owner, for example. Based upon the symptom or symptoms selected, the display screen 39 displays a list 42, specific to the vehicle under test, of possible causes of the symptom or symptoms selected and a counterpart list of test procedures to be performed to check for those causes. The test procedures are listed in the order of the probability or likelihood that the test will be successful in diagnosing the cause of the selected symptom or symptoms, this ranking being displayed as at 43.

In developing the test rankings, during development of the software, focus group technicians evaluate each individual symptom in the symptom list for each specific vehicle. Based on their experience, they develop a list of causes for each symptom and determine a test procedure the user should perform for each cause. They then assign a number, e.g., between one and five, to each cause/test based on:

(a) what tests are needed to determine the cause of the symptoms;

(b) the order in which the tests should be performed based on probability of cause; and (c) in the event of more than one cause having equal probability, ranking the test recommendations by time needed to perform the test procedure, with the shorter times ranked higher.

There are three main criteria in determining the probability of cause for each test, being, in the order of importance:

1. hands-on experience in diagnosing the symptom to cause/test relationship;
2. theory of operation knowledge of how the system works and what systems or components would be the most likely cause for each symptom, and
3. ease of testing and/or time needed to perform the test.

In assessing the rank, hands-on experience is the first thing to be considered. The technician uses the following as a guide in assesing rank:

| RANK | OCCURRENCE |
|------|------------|
| 5 | See it all the time |
| 4 | Very common |
| 3 | Fairly common |
| 2 | Once it awhile |
| 1 | Seldom |

If a test/cause is borderline between two rankings, the technician uses ease of testing as the determining factor. For example: a particular symptom has a fuel delivery test/cause ranking of between 3 and 4. If the test is easy to perform, it is ranked a 4. If it is hard to perform, it is ranked a 3. Ease of testing is only used as a trim factor in assessing rank.

If the technician has no hands-on experience of a symptom to cause/test relationship, the symptom is then examined from a theory of operation viewpoint. Given the technician's knowledge of how system operates and comparing causes/tests to similar system, the technician examines if there are other probable cause/test for each symptom. If so, they are ranked as follows:

| RANK | PROBABILITY |
|------|-------------|
| 3 | Very probable |
| 2 | Probable |
| 1 | Possible |

If a test/cause is borderline between two rankings, ease of testing is used to assign to rank, as outlined above.

If, as in FIG. 3, the user selects more than one symptom and a particular cause is found to be possible for more than one of the selected symptoms, the probability of that cause being the root problem will increase and the recommendation for the associated test will move higher in the recommended testing order.

Once the symptom or symptoms have been selected and the associated recommended test procedures displayed, the user can then select one of the displayed test procedures, and the system will then launch or initiate that procedure. While the screen display 39 lists a recommended order for performing listed tests, the user is free to perform the tests in any order desired.

The screen display 39 includes along a bottom of the screen a series of icons 44-48, respectively corresponding to system modules useful in performing selected test procedures. The module icons shown in FIG. 3 are for purposes of illustration only, and are respectively designated "Quick Tip", "Analyzer", "Scan Tool", "Shop Key" and "Lab Scope/DVOM."

Quick Tips are informational articles pertaining to the symptom of the vehicle being diagnosed. This module provides the technician with information that allows the vehicle to be diagnosed with a minimum of hookup and testing. These tips are created by the technician focus groups based on their experience in diagnosing the selected symptoms. This up-front information could save hours of diagnostic type. When presented to the user, Quick Tips are preferably ranked in the order of importance on a scale of, e.g., 1–5, with 5 being most important. The ranking differentiates between "need to know" and "nice to know" information.

The Shop Key module is a test link that sends the user directly to a library of articles which provides the user with pertinent OEM component test procedures.

The Analyzer module is a link to engine analyzer functions of the platform 10, while the Lab Scope/DVOM module is a link to Lab Scope and DVOM functions of the platform 10. The Scan Tool module is a link to functions of a scanner, such as that sold by Snap-on Diagnostics under the designation MT2500, which is adapted to be coupled to the on-board computer of the vehicle under test.

Once the user selects the test to be performed, the system queries the test library database to determine which module or modules support the particular test to be performed and will then enable and highlight the corresponding icons. When a test procedure is supported by multiple modules, the system indicates which module is deemed most effective by flashing the highlighted icon. When the user selects a highlighted icon, the system launches the appropriate test, or sends the user to the corresponding article in Shop Key, if that is the selected icon.

Launching of a particular test procedure will typically include initiation of a sequence of screen displays directing the user in the performance of the test procedure. For example, if the Scan Tool module is being implemented, the user will be instructed in the manner of connecting and using the associated scanner for downloading information from the vehicle on-board computer and/or controlling operation of certain computer functions, all in a known manner. If, on the other hand, the Analyzer module is selected, the instructions for conducting the selected test procedure will typically include connection of the test leads to the associated vehicle, desired engine operating conditions and the like, all in a known manner.

The initial diagnostic data for this system is gleaned primarily from focus groups containing OEM technicians because their affiliation with a particular OEM provides them with concentrated exposure to those vehicles and increased access to OEM information. However, their experience is usually limited to vehicles less than three years old. Furthermore, their data tends to reflect the problems that exist in the geographical area in which the OEM technicians live. Data gathered in Florida may not accurately reflect the problems existing in a Minnesota winter. The diagnostics of the present system must change over the life of the vehicle to more accurately reflect the problems that occur as the vehicle accumulates mileage and to gain a broader geographical application.

Accordingly, during symptom diagnosis a "Confirm Diagnosis" icon (not shown) may be made available on the screen. When the user has performed a selected test procedure and has found the root cause for the selected symptom or symptoms, the user selects the Confirm Diagnosis icon. The system then displays the symptoms that were selected at the beginning of the diagnosis and the list of recommended tests. The user can choose the test that found the problem and that data is saved to a database. In that database, the system stores the current vehicle, the selected symptoms, the test name, and gives the test a count of 1 for each of the selected symptoms. If a test other than the recommended tests found the problem, the user is presented with a text box to enter a brief description of the test used to isolate the cause of the symptoms. That data is also saved. The saved data is retrieved via modem during a software update process. Data verification and analysis routines will screen the updated data. It will review the number of times each cause/test diagnosed each symptom for each specific vehicle. It will then compare this ratio with the recommendations stored in the database and will modify the ranking order as needed. Each of the user-entered repairs will also be reviewed to determine if a new test should be developed for the system or if the information should be added as a Quick Tip.

Figure 6:
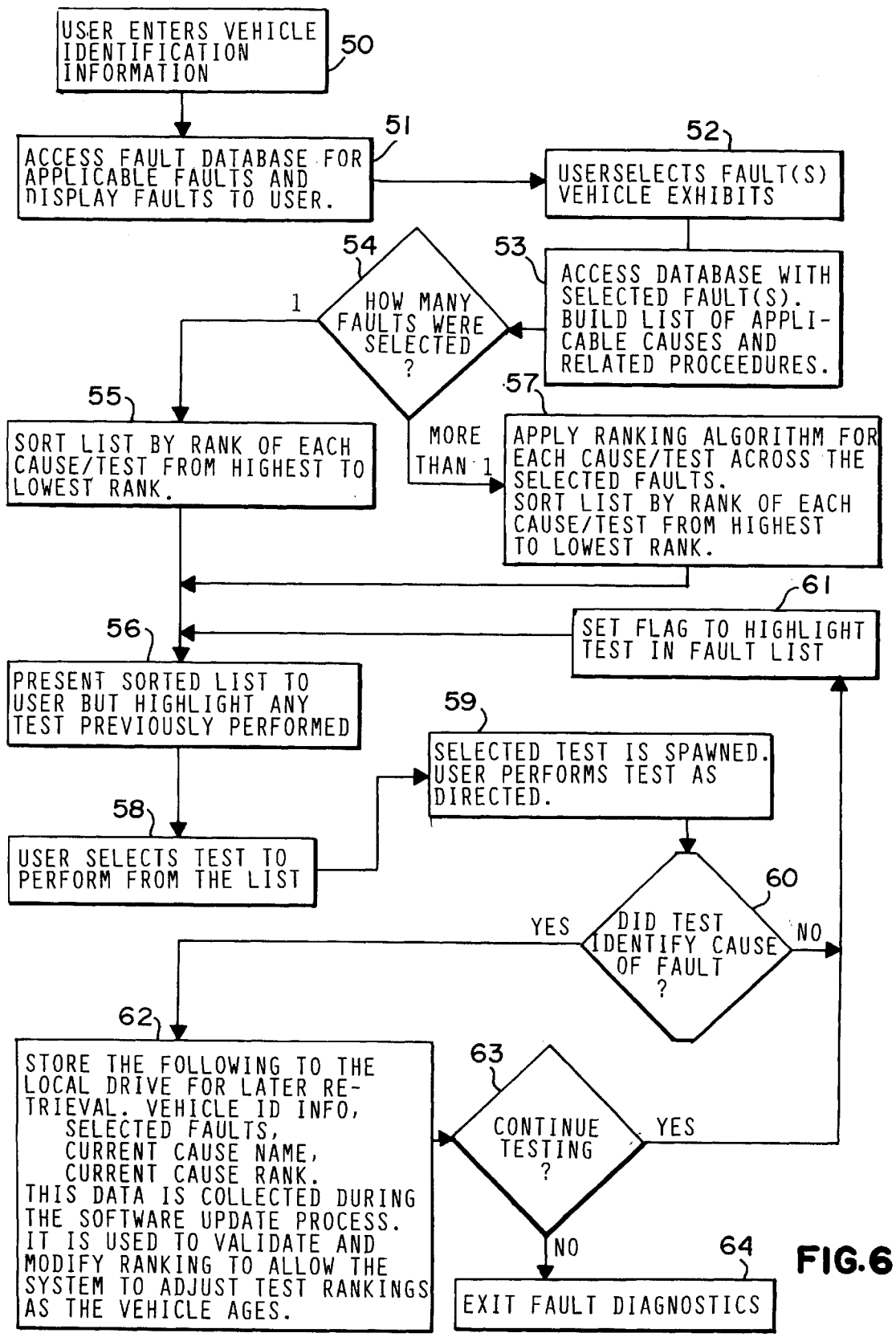
FIG. 6 is a flow chart diagram of program software for the diagnostic system of the present invention.

FIG. 6 is a flow chart illustrating the software program for the present invention using fault-based modes, such as the Symptom Testing mode or the Service Code Testing mode. First, at 50, the user enters vehicle identification information using a screen like that of FIG. 2, and then selects the Test/Analysis icon, which will bring up a screen (see FIG. 3) which will permit the user to select Symptom Testing, Component or System Testing or Service Code Testing mode of operation. When either the Symptom Testing mode or the Service Code Testing mode is selected, the program accesses the appropriate database at 51 and displays the faults (symptoms or service codes) to the user, as in the screen of FIG. 3. The user selects one or more faults at 52, and the system then, at 53, accesses the database with the selected faults and builds a list of applicable causes and related test procedures. In this regard, the program asks at 54 how many faults were selected and, if one was selected it sorts the list at 55 by rank and presents it to the user, as in the screen of FIG. 3, highlighting any tests which have been previously performed at 56. If, at 54, more than one fault was selected, the program at 57 would then apply a ranking algorithm for each cause/test and again sort the list, presenting it to the user in the form of a screen such as that of FIG. 3. The user then, at 58, selects the test to be performed, and the system at 59 spawns the test, prompting the user, as necessary, in the performance thereof. Then, the user will indicate, using an appropriate icon (not shown), whether or not the test identified the cause of the fault, thereby to answer the program query at 60. If it did not, the program highlights that test in the list at 61 and the user then selects another test. If the test did identify the fault, the program at 62 stores that information for later retrieval. The system then asks at 63 if testing is to continue. If so, the last test performed is again highlighted at 61 and, if not, the system exits the fault testing mode at 64.

In the Service Code Testing mode of diagnosis, the operation is basically as described above, except that the technician uses the vehicle service codes as the diagnostic starting point, and the service codes are specific to individual vehicles. When the user selects this mode, by selecting the file 38 at the screen of FIG. 3, the system will allow two different starting methods. In the first method, the system will prompt the user as necessary through a service code access procedure and will utilize the Scan Tool module to read the existing service codes from the vehicle. The system then presents the user with a menu of only the service codes currently stored in the vehicle's computer memory. The user then selects the code he wishes to diagnose. In the second method, the technician has previously retrieved the vehicle's service codes. The system then presents the user with a screen display displaying a menu of all service codes possible on the vehicle being tested. The user selects the code he wishes to diagnose.

Based upon the service code or codes selected, the display screen displays a list of possible causes of the service codes selected and a counterpart list of test procedures to be performed to check for those causes, just as in FIG. 3, above. The test procedures are listed in the order of the probablity or the likelihood that the test will be successful in diagnosing the cause of the selected service code. Selection and launching of a displayed test procedure is accomplished in the same manner described above in connection with the Symptom Testing mode of FIG. 3.

System Testing mode, which can be entered by selecting the Component/System file icon 37 at the screen 39 of FIG. 3, verifies operation of a vehicle subsystem and primarily uses engine analyzer system tests. In this mode of testing, the system does not guide the technician in determining which tests should be performed. The technician uses his own experience to determine which tests are necessary and the order in which they should be performed. Many of these tests are procedural. Each test contains prompting and data collection capability. At the completion of the test a diagnostic engine evaluates the data and presents the diagnostic conclusions.

Figure 4:
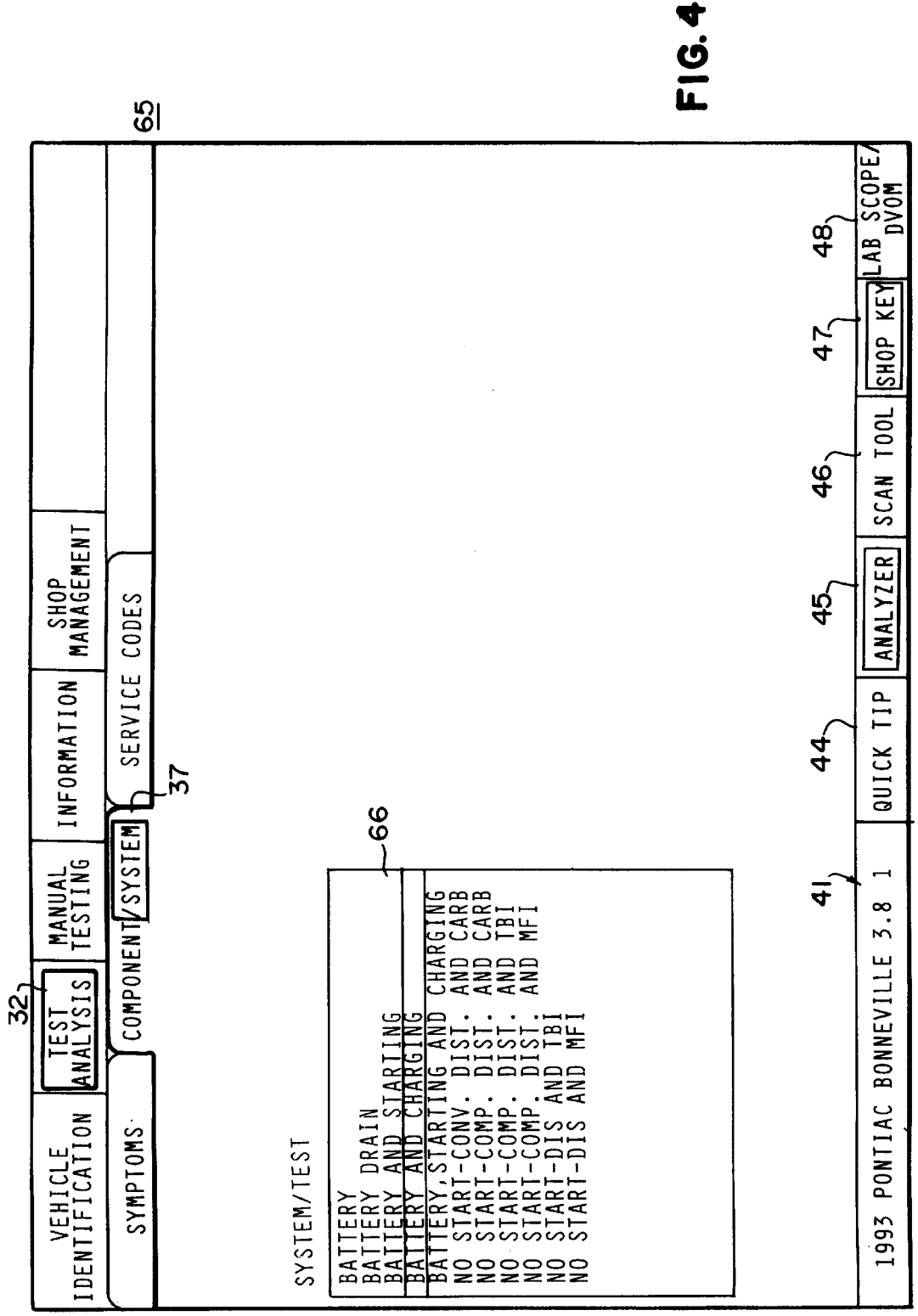

The system initially, at screen display 65, presents the user with a menu 66 of applicable system tests, as illustrated in FIG. 4. The technician selects the desired test from the menu and the system highlights the applicable ones of the module icons 44–48. The user selects a highlighted module and an associated test is launched. If the user returns to the system testing screen of FIG. 4, any test that has been previously completed will be shown in a different color. This provides a mechanism to track which tests have been performed in this diagnostic session. The system prompts the user during the performance of each test and also collects the test data and, at the completion of the test, evaluates the data and presents the user with diagnostic conclusions. Once the test is completed, the system will indicate this fact, so that it is not inadvertently repeated.

Figure 5:
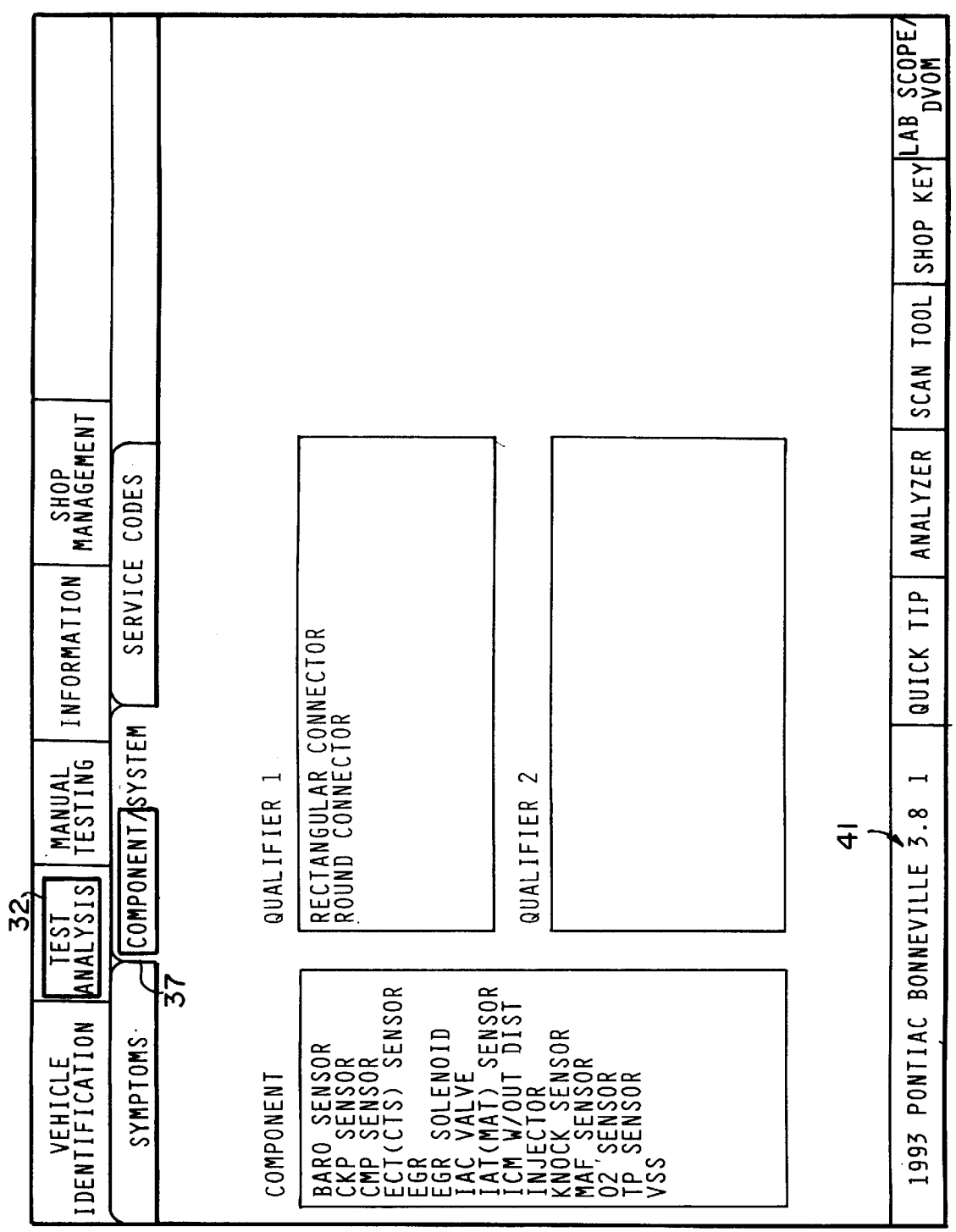

If Component Testing mode is selected, the screen display 67 of FIG. 5 will appear. Component tests verify the operation of a single component of the vehicle. In this mode of testing, the system does not guide the technician in determining which tests should be performed. The technician uses his own experience to determine which tests are necessary and the order in which they should be performed.

The component test database contains pointers to tests in the test library which apply to the specific vehicle being tested. The list of vehicle component tests available to the user is dynamic, since each vehicle has potentially a unique set of components. The component test library may contain hundreds of component tests. The screen display 67 of FIG. 5, lists the available component tests for the vehicle being diagnosed. The user selects the appropriate component test. The system will highlight the applicable modules using the icons 44–48 that support testing the selected component. The user selects a highlighted module to launch an appropriate test, in essentially the same manner as was described above in connection with the system-based diagnosis mode.

From the foregoing, it can be seen that there has been provided an improved dynamic diagnostic system which accommodates a number of different diagnostic methods, including problem-based diagnosis, and which is easily updated to take account of service experience with the vehicle during its useful life.

While particular embodiments of the present invention have been shown and described, it will be apparent to those skilled in the art that changes and modifications may be made without departing from the invention in its broader aspects. The matter set forth in the foregoing description and accompanying drawings is offered by way of illustration only and not as a limitation.

What is claimed is:

1. A diagnostic system comprising:
   a processor operating under stored program control,
   a storage mechanism coupled to the processor and storing a knowledge database including a library of information items relating to faults which can be experienced by an apparatus under diagnosis and a library of tests which can be performed on the apparatus for the purpose of diagnosing the causes of the faults,
   a user interface including a display device and a data input device both coupled to the processor for interactive control thereby,
   and a computer routine executed by the processor for controlling the operation of the display device, said computer routine including;
   (a) a first portion operative to display a collection of information items, and
   (b) a second portion responsive to user selection of one or more displayed information items by use of said data input device for selecting from the library of tests those tests applicable to diagnosing of the cause of the fault related to the selected information item or items, hierarchically arranging the selected tests in a list in the order of their likelihood of successfully diagnosing of the cause of the fault, and displaying the hierarchically arranged list of tests.

2. The system of claim 1, wherein said information items include symptoms exhibited by the apparatus under diagnosis.

3. The system of claim 1, wherein said information items include service codes for the apparatus under diagnosis.

4. The system of claim 1, wherein said computer routine includes a portion operative to display lists of apparatus identification information and permitting user selection of a specific type of apparatus to be diagnosed by use of said data input device, said first and second portions of said computer routine being operative only with respect to information items and tests pertinent to the selected apparatus type.

5. The system of claim 1, wherein the knowledge database includes a library of apparatus parameters which can be tested.

6. The system of claim 5, wherein said library of parameters includes identification of apparatus subsystems and test procedures associated therewith.

7. The system of claim 5, wherein said library of parameters includes identifications of apparatus components and test procedures associated therewith.

8. The system of claim 5, wherein the associated apparatus has an on-board computer, said library of parameters including service codes which can be registered by said on-board computer.

9. The system of claim 8, wherein said modules include a link to a scanner adapted for connection to the apparatus on-board computer for reading service codes therefrom.

10. The system of claim 5, wherein the apparatus under diagnosis is an automotive vehicle engine and said modules include a link to an engine analyzer.

11. A diagnostic system comprising:
    a processor operating under stored program control,
    a storage mechanism coupled to the processor and storing a knowledge database including a library of information items relating to faults which can be experienced by an apparatus under diagnosis and a library of tests which can be performed on the apparatus for the purpose of diagnosing the causes of the faults,
    a user interface including a display device and a data input device both coupled to the processor for interactive control thereby,
    a test probe assembly coupled to the processor and adapted to be coupled to an apparatus for acquiring parameter data therefrom for testing thereof,
    and a computer routine executed by the processor for controlling the operation of the display device, said computer routine including;
    (a) a first portion operative to display a collection of information items,
    (b) a second portion responsive to user selection of one or more displayed information items by use of said data input device for selecting from the library of tests those tests applicable to diagnosing of the cause of the fault related to the selected information item or items, hierarchically arranging the selected tests in a list in the order of their likelihood of successfully diagnosing of the cause of the fault, and displaying the hierarchically arranged list of tests, and
    (c) a third portion responsive to user selection of one of the displayed tests by use of said data input device for initiating a display sequence associated with performance of the selected test procedure by use of the test probe assembly.

12. The system of claim 11, wherein said information items include symptoms exhibited by the apparatus under diagnosis.

13. The system of claim 11, wherein said information items include service codes for the apparatus under diagnosis.

14. The system of claim 11, wherein said computer routine includes a portion operative to display lists of apparatus identification information and permitting user selection of a specific type of apparatus to be diagnosed by use of said data input device, said first and second and third portions of said computer routine being operative only with respect to information items and tests pertinent to the selected apparatus type.

15. The system of claim 11, wherein said computer routine includes a portion responsive to said data input device for causing storage of user-input information regarding the results of the performance of selected test procedures in diagnosing the cause of apparatus faults.

\* \* \* \* \*